(12) United States Patent
Davis et al.

(10) Patent No.: US 8,266,293 B2
(45) Date of Patent: Sep. 11, 2012

(54) METHOD OF LOAD BALANCING EDGE-ENABLED APPLICATIONS IN A CONTENT DELIVERY NETWORK (CDN)

(75) Inventors: Andrew T. Davis, San Francisco, CA (US); Nate Kushman, Boston, MA (US); Jay G. Parikh, Redwood City, CA (US); Srinivasan Pichai, Foster City, CA (US); Daniel Stodolsky, Somerville, MA (US); Ashis Tarafdar, Wayland, MA (US); William E. Weihl, San Francisco, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 13/411,665

(22) Filed: Mar. 5, 2012

(65) Prior Publication Data

US 2012/0166650 A1 Jun. 28, 2012

Related U.S. Application Data

(63) Continuation of application No. 12/701,965, filed on Feb. 8, 2010, now Pat. No. 8,131,835, and a continuation of application No. 10/823,871, filed on Apr. 14, 2004, now Pat. No. 7,660,896.

(60) Provisional application No. 60/463,071, filed on Apr. 15, 2003.

(51) Int. Cl.
*G06F 15/173* (2006.01)
(52) U.S. Cl. ........................................ 709/226; 709/224
(58) Field of Classification Search .................. 709/224, 709/226
See application file for complete search history.

*Primary Examiner* — Adnan Mirza
(74) *Attorney, Agent, or Firm* — David H. Judson

(57) ABSTRACT

A method and system of load balancing application server resources operating in a distributed set of servers is described. In a representative embodiment, the set of servers comprise a region of a content delivery network. Each server in the set typically includes a server manager process, and an application server on which edge-enabled applications or application components are executed. As service requests are directed to servers in the region, the application servers manage the requests in a load-balanced manner, and without any requirement that a particular application server spawned on-demand.

9 Claims, 3 Drawing Sheets

METHOD OF LOAD BALANCING EDGE-ENABLED APPLICATIONS IN A CONTENT DELIVERY NETWORK (CDN)

This application is a continuation of Ser. No. 12/701,965, filed Feb. 8, 2010, now U.S. Pat. No. 8,131,835, which application is a continuation of Ser. No. 10/823,871, filed Apr. 14, 2004, now U.S. Pat. No. 7,660,896, which application was based on and claimed priority to Ser. No. 60/463,071, filed Apr. 15, 2003.

BACKGROUND OF THE INVENTION

1. Technical Field

The present invention relates generally to execution of Web-based applications in a content delivery network.

2. Description of the Related Art

Enterprises can expand their business, increase efficiency, and enable new revenue streams by extending their business applications over the Internet to customers, partners, and suppliers. One way to enable enterprises to shift the operational burden of running a reliable and secure Web presence is to outsource that presence, in whole or in part, to a service provider, such as a content delivery network (CDN). A content delivery network is a collection of content servers and associated control mechanisms that offload work from Web site origin servers by delivering content (e.g., Web objects, streaming media, HTML and executable code) on their behalf to end users. Typically, the content servers are located at the "edge" of the Internet. A well-managed CDN achieves this goal by serving some or all of the contents of a site's Web pages, thereby reducing the customer's infrastructure costs while enhancing an end user's browsing experience from the site. In operation, the CDN uses a request routing mechanism to locate a CDN edge server electronically close to the client to serve a request directed to the CDN. Sites that use a CDN benefit from the scalability, superior performance, and availability of the CDN service provider's outsourced infrastructure.

Many enterprises, such as those that outsource their content delivery requirements, also implement their business services as multi-tier (n-tier) applications. In a representative n-tiered application, Web-based technologies are used as an outer (a first or "presentation") tier to interface users to the application, and one or more other tiers comprise middleware that provides the core business logic and/or that integrates the application with existing enterprise information systems. The Java 2 Platform, Enterprise Edition (J2EE™) is a technology and an associated component-based model that reduces the cost and complexity of developing such multi-tier, enterprise services. The J2EE runtime environment defines several types of application components that can be used to build services. These include (a) Web tier components (e.g., servlets, JSP pages, Java beans, filters, and web event listeners), which are components that typically execute in a web server and respond to HTTP requests from web clients, and (b) Enterprise tier components (e.g., session beans, entity beans and message driven beans, which may be developed as Enterprise JavaBeans™ (EJB™)), that include the business logic and that execute in a managed environment to support transactions. Runtime support for J2EE application components are provided by so-called "containers," with a Web container supporting the Web tier components, and an Enterprise container supporting the Enterprise tier components. Containers execute the application components and provide utility services. J2EE-compliant servers provide deployment, management and execution support for conforming application components.

The provisioning of server-side Java applications or application components to run on CDN edge servers presents complex deployment and operational issues. A solution is described in commonly-owned, copending application Ser. No. 10/340,206, filed Jan. 10, 2003, titled "Java Application Framework For Use In A Content Delivery Network." According to that application, given edge servers in the CDN are provisioned with application server code used to execute Web tier components of an application (an "edge-enabled application"). In an illustrative embodiment, these application servers (appserver) are run out of process from a CDN server manager process, preferably one for every customer. Child appserver processes are forked/exec'd from the CDN server manager process, after which they are tightly monitored and controlled by a Java Manager subsystem. The CDN server manager process forwards a client request that requires appserver processing over local TCP socket to a child appserver process, which processes the request, and sends the response on the same connection. In addition, resource utilization load is reported from each appserver process, preferably across a shared memory segment, to the Java Manager subsystem. The Java Manager subsystem tightly monitors resource utilization of each child appserver process and will kill appserver processes that over utilize resources.

Java application servers typically are started on-demand, as in-bound requests are mapped to web applications (sometime referred to as "webapps"). Each application server process may also map to a content provider (i.e., a customer) code, so if an in-bound request maps to a webapp on a customer code for which no application server process is running, a new application server process may be started. Once started, the webapp can be installed in this application server process, and once installed, the request can be serviced.

If application server processes continue to spawn on demand, resources on the machine may start to run out so that it may not be possible to start another application server process on that machine. Because application servers may take on the order of 30-60 seconds to start and load, and because web applications can also take on the order of 10-20 seconds to load, misses for application processing requests can expensive from a request latency perspective. Indeed, spawning application servers in an on-demand fashion may lead the CDN server manager process into an undesirable state, where it is launching an application server for each new customer code that is requested, and it may deny service to requests when it hits a resource limit.

The present invention addresses this problem.

BRIEF DESCRIPTION OF THE DRAWINGS

For a more complete understanding of the present invention and the advantages thereof, reference should be made to the following Detailed Description taken in connection with the accompanying drawings, in which.

DETAILED DESCRIPTION OF THE PREFERRED EMBODIMENT

The present invention leverages Internet CDN architecture and functionality such as generally described below. Familiarity with Java programming conventions and the J2EE architecture are presumed. Additional information about J2EE is available in the publication titled Java 2 Platform Enterprise Edition Specification v1.3 (July 2001), which is available from Sun Microsystems.

By way of background, it is known in the prior art to deliver digital content (e.g., HTTP content, streaming media and applications) using an Internet content delivery network (CDN). A CDN is a network of geographically-distributed content delivery nodes that are arranged for efficient delivery of content on behalf of third party content providers. Typically, a CDN is implemented as a combination of a content delivery infrastructure, a DNS request-routing mechanism, and a distribution infrastructure. The content delivery infrastructure usually comprises a set of "surrogate" origin servers that are located at strategic locations (e.g., Internet network access points, Internet Points of Presence, and the like) for delivering content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently-accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system.

Figure 1:
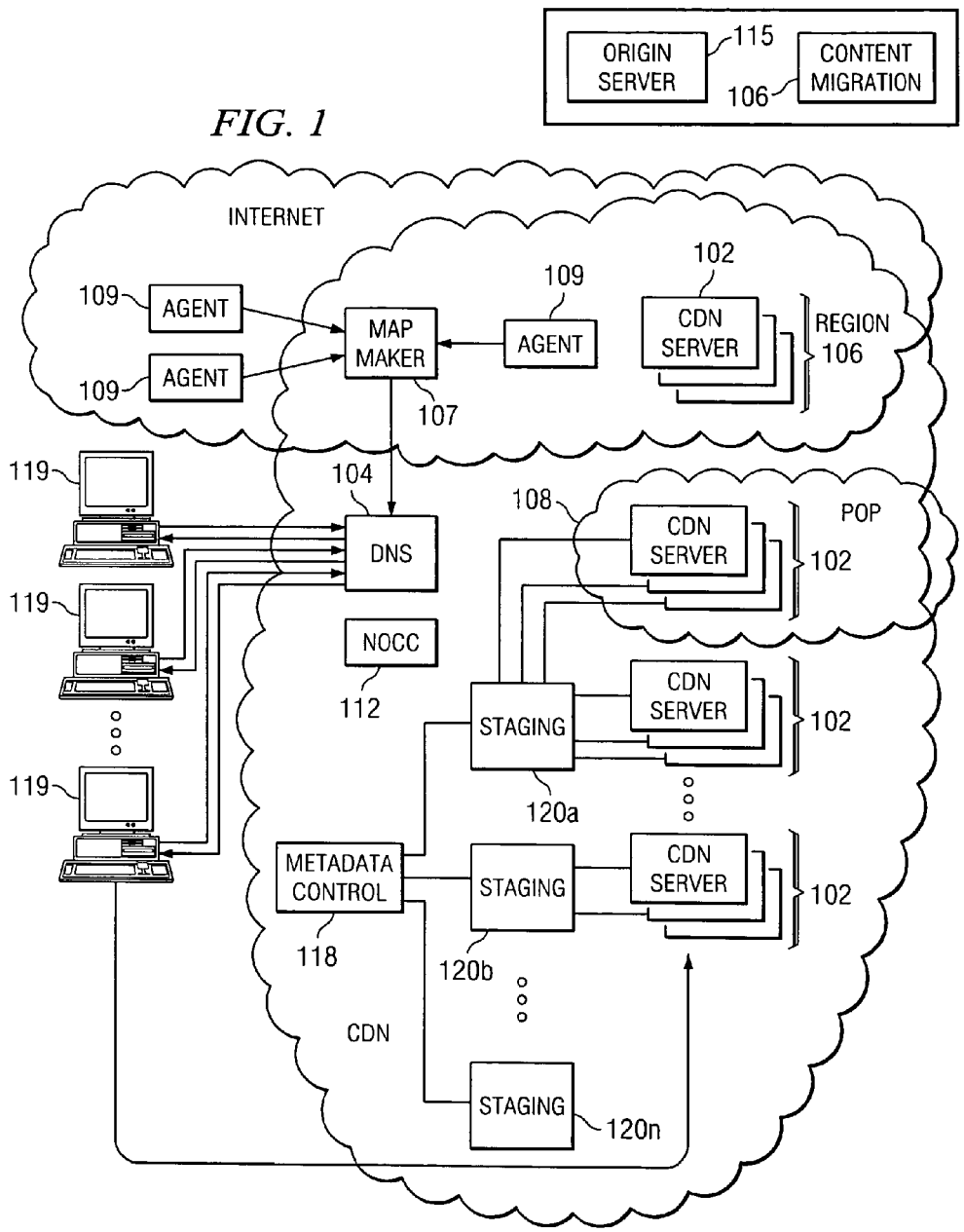
FIG. 1 is a block diagram of a known content delivery network in which the present invention may be implemented.

As seen in FIG. 1, an Internet content delivery infrastructure usually comprises a set of "surrogate" origin servers 102 that are located at strategic locations (e.g., Internet network access points, and the like) for delivering copies of content to requesting end users 119. A surrogate origin server is defined, for example, in IETF Internet Draft titled "Requirements for Surrogates in the HTTP" dated Aug. 9, 2000, which is incorporated herein by reference. The request-routing mechanism 104 allocates servers 102 in the content delivery infrastructure to requesting clients. The distribution infrastructure consists of on-demand or push-based mechanisms that move content from the origin server to the surrogates. A CDN service provider (CDNSP) may organize sets of surrogate origin servers as a group or cluster, sometimes called a "region." In this type of arrangement, a CDN region 106 typically comprises a set of one or more content servers that share a common back-end network, e.g., a LAN, and that are located at or near an Internet access point. A typical CDN region may be co-located within an Internet Service Provider (ISP) Point of Presence (PoP) 108 or some other data center. A "region" need not be associated with or imply any geographic association. A representative CDN content server is a Pentium-based caching appliance running an operating system (e.g., Linux-based, Windows NT, Windows 2000) and having suitable RAM and disk storage for CDN applications and content delivery network content (e.g., HTTP content, streaming media and applications). Such content servers are sometimes referred to as "edge" servers as they are located at or near the so-called outer reach or "edge" of the Internet. An "edge" server need not be associated with or imply any particular geographic association, however. The CDN typically also includes network agents 109 that monitor the network as well as the server loads. These network agents are typically co-located at third party data centers or other locations. Mapmaker software 107 receives data generated from the network agents and periodically creates maps that dynamically associate IP addresses (e.g., the IP addresses of client-side local name servers) with the CDN regions.

Content may be identified for delivery from the CDN using a content migrator or rewrite tool 106 operated, for example, at a participating content provider server. Tool 106 rewrites embedded object URLs to point to the CDNSP domain. A request for such content is resolved through a CDNSP-managed DNS to identify a "best" region, and then to identify an edge server within the region that is not overloaded and that is likely to host the requested content. Instead of using content provider-side migration (e.g., using the tool 106), a participating content provider may simply direct the CDNSP to serve an entire domain (or subdomain) by a DNS directive (e.g., a CNAME). In either case, the CDNSP may provide object-specific metadata to the CDN content servers to determine how the CDN content servers will handle a request for an object being served by the CDN. Metadata, as used herein, refers to a set of control options and parameters for the object (e.g., coherence information, origin server identity information, load balancing information, customer code, other control codes, etc.), and such information may be provided to the CDN content servers via a configuration file, in HTTP headers, or in other ways. The Uniform Resource Locator (URL) of an object that is served from the CDN in this manner does not need to be modified by the content provider. When a request for the object is made, for example, by having an end user navigate to a site and select the URL, a customer's DNS system directs the name query (for whatever domain is in the URL) to the CDNSP DNS request routing mechanism. Once an edge server is identified, the browser passes the object request to the server, which applies the metadata supplied from a configuration file or HTTP response headers to determine how the object will be handled.

As also seen in FIG. 1, the CDNSP may operate a metadata transmission system 116 comprising a set of one or more servers to enable metadata to be provided to the CDNSP content servers. The system 116 may comprise at least one control server 118, and one or more staging servers 120*a-n*, each of which is typically an HTTP server (e.g., Apache). Metadata is provided to the control server 118 by the CDNSP or the content provider (e.g., using a secure extranet application) and periodically delivered to the staging servers 120*a-n*. The staging servers deliver the metadata to the CDN content servers as necessary. Of course, any other convenient data transport mechanism may be used to deliver the customer metadata to the CDN servers.

Figure 2:
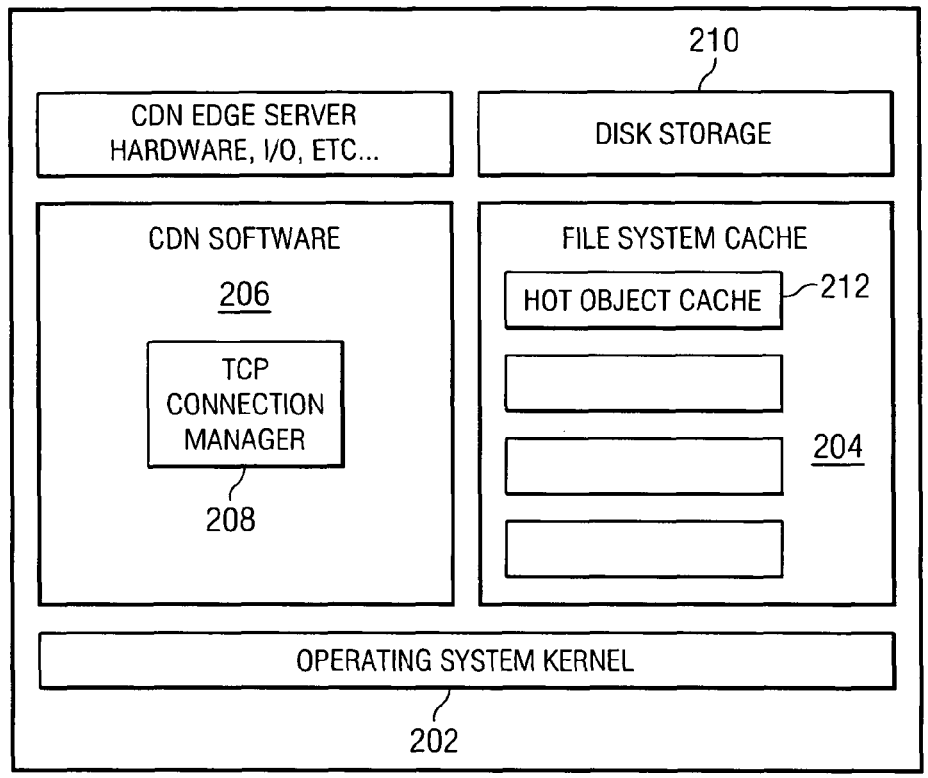
FIG. 2 illustrates a typical machine configuration for a CDN edge server.

FIG. 2 illustrates a typical machine configuration for a CDN edge server. Typically, the content server 200 is a caching appliance running an operating system kernel 202, a file system cache 204, server manager software 206, TCP connection manager 208, and disk storage 210. Server manager software 206, among other things, creates and manages a "hot" object cache 212 for popular objects being served by the CDN. It may also provide other CDN-related functions, such as request routing, in-region load balancing, and the like. In operation as an HTTP cache for example, the content server 200 receives end user requests for content, determines whether the requested object is present in the hot object cache or the disk storage, serves the requested object via HTTP (if it is present) or establishes a connection to another content server or an origin server to attempt to retrieve the requested object upon a cache miss. Typically, the edge server operates in a "pull" manner, wherein an object is pulled into the cache initially upon the first request to the cache—which will generate a cache miss since the object is not present. This is not required, however, as content may be pushed into the server before it is requested for the first time.

The CDN also includes an application framework comprising, for example, at least one region of application server-enabled edge servers. In such case, a given edge server (the machine) such as illustrated above in FIG. 2 also includes application server code. As is well-known, an application server is a software platform (sometimes called middleware) on which applications can be deployed. It provides useful utility services and functions to applications. There are currently several major types of application servers, Java-based (J2EE) and Microsoft .NET. Java, of course, is a programming language and a platform, and the programming language is object-oriented and platform independent. Applications written in Java are translated into Java byte code, which code is then run on (interpreted by) a Java Virtual Machine (JVM). In one embodiment, the present invention takes advantage of given edge servers in the CDN that are provisioned with application server and additional code to enable applications or application components to be executed from the edge of the Internet. The framework can take advantage of and leverage the mapping, load-balancing and management systems used with known CDN offerings, such as the CDN illustrated in FIG. 1 (which is merely representative). In a first embodiment, the application server is a servlet container (e.g., Apache Tomcat), to enable offloading and execution of the Web tier of n-tier Java-based applications. JSP, servlets, Java beans and custom tags, which are executed within an application server's servlet container, are executed at the edge of the Internet, close to the end-user. The Web tier is typically the front end of a J2EE server. In an alternate embodiment, in addition to the Web tier, at least some or all of the Enterprise tier of the application is also deployed to and executed on a given edge server. The Enterprise or "business" tier typically hosts application-specific business logic and provides system-level services such as transaction management, concurrency control, and security. Further details of a preferred Java-based application framework are described in copending, commonly-owned Ser. No. 10/340,206, the disclosure of which is incorporated by reference.

Figure 3:
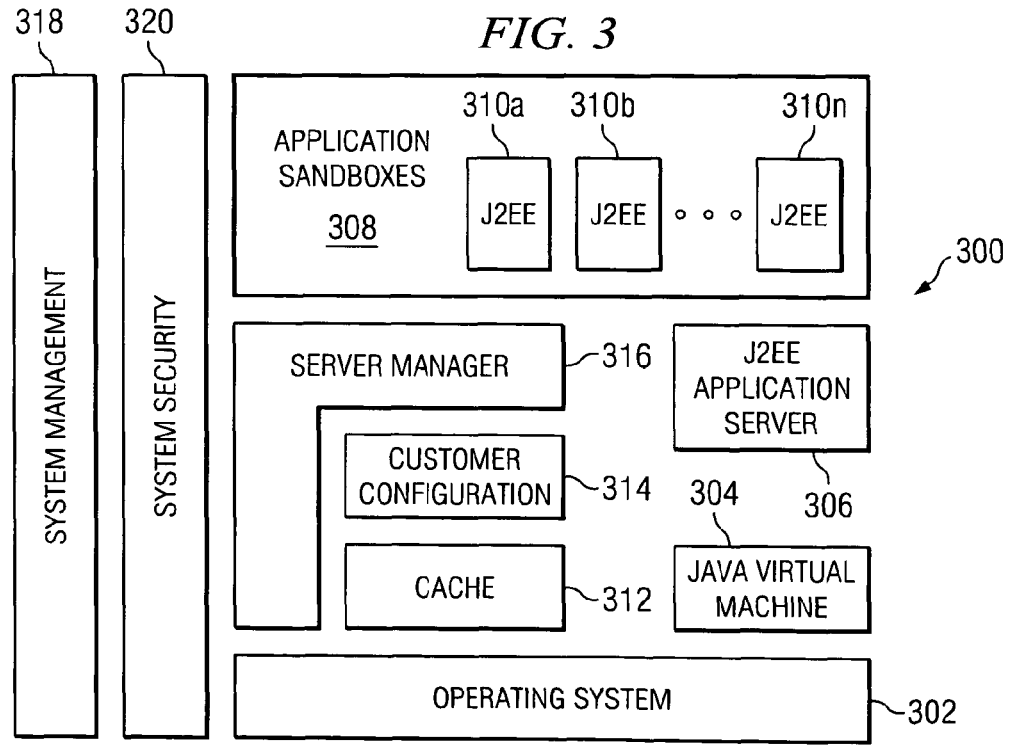
FIG. 3 illustrates a typical machine configuration for a CDN edge server that is provisioned to executed edge-enabled applications or application components.

FIG. 3 illustrates a representative edge server architecture for a CDN server in the edge-enabled application region(s). A given region includes one or more of such servers that are interconnected over a common back-end LAN, as previously described. The server 300 preferably runs on commodity hardware running an operating system (e.g., a modified form of Linux) 302. The Java stack includes a Java Virtual Machine (JVM) 304 and preferably a J2EE-compliant application server 306. For Web tier components, the application server 306 may be implemented with Apache Tomcat servlet container. In particular, a representative Web container is provided by Apache Tomcat servlet container, which uses the JVM in JDK 1.3.1_04 available from Sun Microsystems. Of course, these components are merely exemplary and are not meant to be limiting. For Web tier and Enterprise tier components, the application server 306 may be implemented with IBM WebSphere Application Server (WAS), such as Version 5.0 application server (WAS). IBM WebSphere uses JVM (Java Virtual Machine) 1.3.1. These products, of course, are merely exemplary. The framework (preferably the JVM) creates and maintains application sandboxes 308 for each of the applications 310a-n. A given customer may run application 310a, while another customer runs application 310b. Generalizing, the edge server 300 supports one or more discretely-executable applications. The edge server 300 implements a cache 312 and maintains customer configuration data 314 that controls when application components are used. The server manager 316 overlays and controls the cache, using the customer configuration data. System management 318 and system security 320 modules are also provided to facilitate these and other functions.

Figure 4:
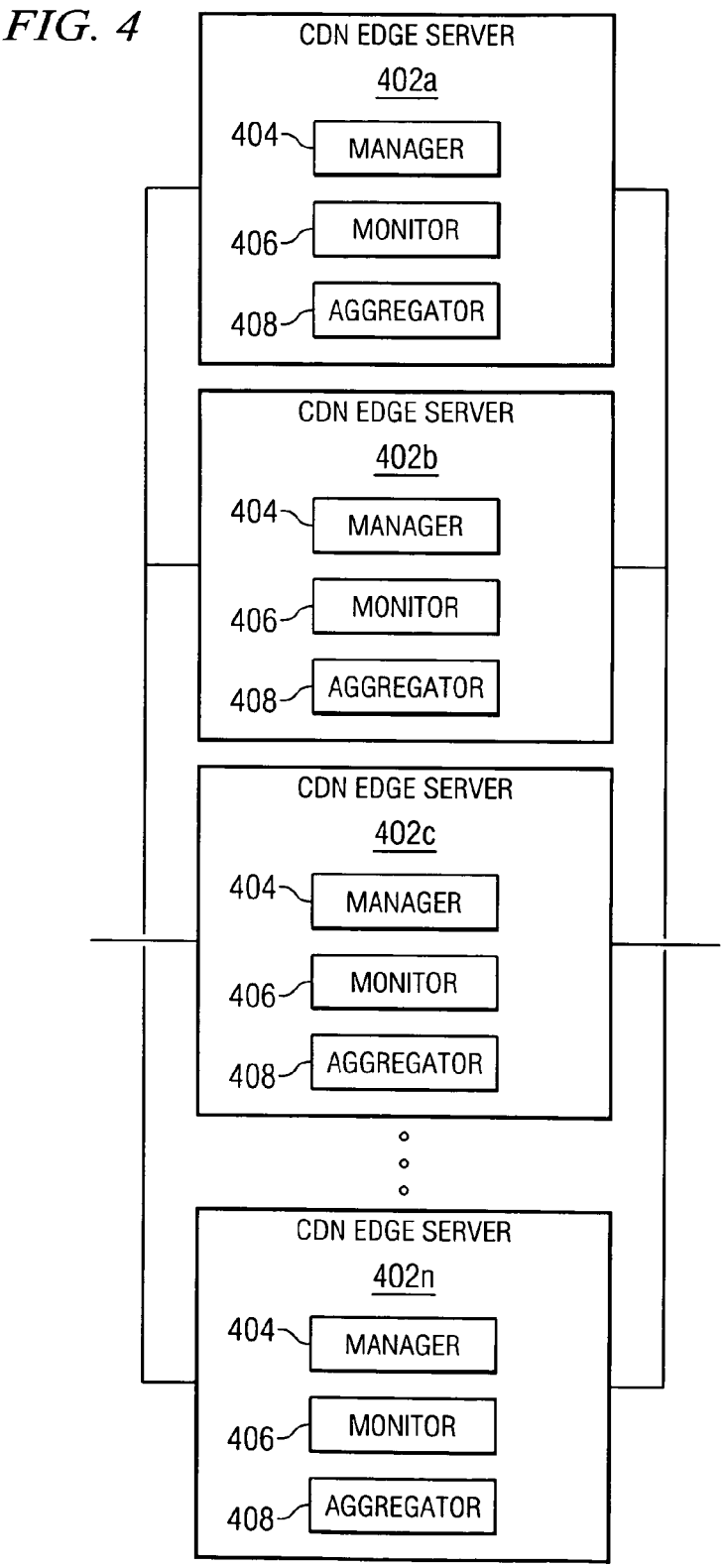
FIG. 4 illustrates a cluster of CDN servers in which the load-balancing technique of the present invention may be implemented.

As illustrated in FIG. 4, the CDN includes at least a first edge server region 400 having one or more edge servers 402a-n provisioned with an application framework on which edge-enabled applications or application components are executed. A given edge server 402 is illustrated in FIG. 3. Instead of trying to load every application on every machine, a new load balancing scheme is described below that uses server resources more intelligently across the content delivery network. Because the cost of starting application servers and loading applications is much, much higher than retrieving a typical static object (from origin or from cache peer/parent), it is much better to send requests for a particular application to a server that already has the application loaded.

According to the invention, when a edge server manager process receives a request for which it does not have the application loaded, it does not try to load the application. Rather, the request is forwarded (e.g., by tunneling) to others machines that have the application loaded. In this way, network resources are much better utilized and denial of service is avoided. To enable a CDN server manager process to tunnel, preferably it is provided a global view of "what is loaded where" in its particular region. In addition, the server manager process preferably is provided with information about what the "desired" state of "what should be loaded where". These are the basic premises around the load balancing scheme described herein.

With the above as background, the following terms are now defined:

Appserver: A Java application server or servlet container that complies with a given specification, such as the Servlet Specification of Sun Microsystems. This is a Java program that runs in a JVM, and hosts the execution of Java-based webapps.

Webapps: Java applications as defined by a given specification, such as the Sun Microsystems Servlet Specification. A typical Java application is a combinations of servlets, JSPs, static resources, and class library jar archives.

WAR file: A Web Application aRchive (WAR) file, which contains all of the necessary class files, static resources, JSPs, and jars necessary to run a webapp.

Java heap: Each JVM instance may manage an internal block of memory, in which it allocates and garbage collects Java objects. The maximum and minimum size of this heap preferably is configurable, and it is set when the JVM is initialized. Note that the Java heap typically is part of the memory used by the appserver process, and it is reported to a given process (which is called DNSP as described below) as such.

Appserver process size: This is the total memory used by the appserver process, and typically it includes the memory used by the Java heap, internal JVM data structures, and the like.

Overview

As illustrated in FIG. 4 and by way of additional background, each server 402a-402n in a given server region 400 includes several processes: a CDN server manager process 404, a monitor process 406, and an aggregator process 408. These processes are shown as distinct and independent, but this is not a requirement. The server manager 404 publishes metadata and resource utilization information for webapps and appserver processes to the monitor process 406. The monitor process 406 windows this data, publishes query tables based on this data, and also publishes this data (preferably over UDP transport) to the aggregator process 408. Process 408 acts as the global aggregator of data related to webapps and appservers from each CDN server manager in the region. The aggregator process 408 preferably keeps state as to which webapps are running on which CDN server manager, and it publishes this information in a first map (or other data construct) to each CDN server manager running in the region 400. This map tells each CDN server manager "what is loaded where," and it allows a particular CDN server manager to implement a communication policy (e.g., tunneling) based on this map. The aggregator process 408 also preferably implements a load balancing algorithm from which the output is a second map that is published over the same communication channel. This second map tells the CDN server manager "what should be loaded where," and it allows the CDN server manager to implement a webapp loading policy based on this second map. Using the second map, the aggregator process 408 can ask a given CDN server manager running on a give machine to load a webapp, e.g., by adding that webapp to this second map for that CDN server manager, or by "mapping" that webapp to that CDN server manager.

The following policies may then be implemented to facilitate load balancing:

Request Tunneling Policy—based on the maps received from the aggregator process, a given CDN server manager may implement the following tunneling policy:
1. mapped and loaded—route the request to a CDN server manager that has the application loaded and for which the aggregator process has that application mapped;
2. loaded, but not mapped—route the request to a CDN server manager that has the application loaded, even if it is not mapped;
3. deny—send an error page to the user, and deny service to the request.

Alternatively, tunnel this request to another region where there is support.

Webapp Loading Policy—based on the maps received from the aggregator process, a given CDN server manager may implement the following webapp loading policy:
1. load if mapped—if a webapp is "mapped" by the aggregator process for the machine IP on which the given CDN server manager is executing, then aggressively load this webapp;
2. unload if unmapped—if the aggregator process has removed a webapp id for the IP address on which the given CDN server manager is executing, then uninstall this webapp from the appserver in which it is running.

The following is a more detailed design of the load balancing algorithm:

Recap of the Problem

Interfaces:
The flit-load incoming in a region is divided based on the content requested into buckets called serials. The flit-load is further divided based on the webapp requested. Each webapp is in a unique serial and each serial may contain multiple webapps.

A "flit" is an arbitrary unit of work generally representing non-bandwidth resource usage on a given server machine. Such utilization typically encompasses CPU utilization, disk utilization, usage of hardware accelerator cards (such as SSL accelerators), operating system abstraction-limited resources such as threads and semaphores, and the like, and combinations thereof. In a representative embodiment, a flit is a given linear or convex function of several individual machine variables, such as CPU and disk utilizations. For the load balancing described generally below, however, CPU utilization on a given machine is a good approximation for the flit value.

Webapps need to be preloaded in memory otherwise the amount of time taken to load (10's of seconds) a webapp on-demand may cause a service denial. The webapps typically run inside appservers (an appserver is an application running on a JVM that acts as a runtime environment for webapps) that have some memory overhead and typically take a long time to load (1-2 minutes). Webapps of the same customer typically run in their own appserver. Each appserver may have a pre-allocated memory heap from which it allocates memory for the various webapps. If the appserver-heap runs out of memory, the webapps running in that appserver are very likely to be unavailable. One can distinguish memory allocated from the server manager's system heap from the "heap-memory" allocated from the appserver's internal heap. The total memory used on a server manager is the memory pre-allocated for each appserver heap plus the memory overhead per appserver.

As used below, a server manager is referred to as "ghost" as a shorthand for global host. The monitor process is "ghostmon" and the aggregator process is "dnsp".

Inputs:
flit-capacity per-ghost
flit-load per-ghost, per-webapp
memory-capacity per-ghost
memory-used per-ghost
heap-memory-capacity per-ghost, per-appserver-heap
heap-memory-used per-ghost, per-appserver-heap Outputs:
a weighted mapping from webapps to set of ghosts,
  (the webapps are to be pre-loaded on the mapped ghosts and the requests are to be sent to those ghosts in proportion to their weights)
heap-memory-capacity per-ghost, per-appserver-heap
  (the appserver is to be set to this capacity)

Objectives:
1: to reduce the chance of running out of memory
2: to reduce the chance of running out of flits
3: to reduce the overhead flits
  (overhead flits are caused by (un)loading webapps and appservers)
4: to reduce the chances of a session-state miss (i.e. stickiness)

Proposed Solution

Requirements
The following requirements assume the steady state and ideal memory estimates. As an optimization, it is desirable to add requirements for time to reach steady state and how much off the memory estimates can be.

Preferred Requirements:
1. Memory constraints:
    The memory capacity of a ghost is never exceeded, and the max-heap capacity of an appserver is never exceeded.
2. Extent of webapp spreading:
    If n is the num. instances of a webapp_type with total flits f, then:
        $\max(f/LTW, MW) < n < f/UTW$
    unless the region is out of memory or flit-disbalanced.
3. Extent of appserver spreading:
    If n is the num. instances of an appserver_type with total flits f,
        m is the max. instances across webapp_types for the appserver_type,
        w is the memory needed for all webapps of the appserver_type
        $\max(f/LTA, m, w/MXHP) < n < f/UTA$
    unless the region is out of memory or flit-disbalanced.
4. Balancing flits given current webapp/appserver placement:
    Given the current state of loaded webapps, the flits are directed optimally, so as to minimize the max flit-percent across ghosts.
5. Balancing flits:
    The region typically is not flit-disbalanced unless the region is out of memory.

EXPLANATION OF TERMS

A region is "out of memory" if it does not have enough memory on any ghost to load another appserver containing the largest webapp.
A region is "flit-disbalanced" if the flit-percent of a ghost is >max (FDC, FDM+average flit-percent across ghosts)
The following are dynamic configurable parameters:
    FDM—flit-disbalance—margin—possible value: 50%
    FDC—flit-disbalance cutoff—possible value: 70%
    LTW—loading threshold for webapp—possible value: 20%
    UTW—unloading threshold for webapp—possible value: 10%
    LTA—loading threshold for appserver—possible value: 20%
    UTA—unloading threshold for appserver—possible value: 10%
    MW—minimum numer of webapps of each type—possible value: 2
    MXHP—max-heapsize for appserver—possible value: 30 MB
LTW/UTW will be configurable per-webapp-type.
LTA/UTA/MXHP will be configurable per-cpcode and per appserver-type.
LTW/UTW/LTA/UTA are expressed relative to the min (optionally, avg) flit capacity across ghosts.
The inequalities above may be adjusted for boundary conditions and to make sure that the lower_bounds are less than the upper_bounds.
High-Level Design
    To attempt to break the complexity down into smaller chunks, the following is the new structure of the LoadBalancer in dnsp (the aggregator process).
        LoadBalancer: manages shared resources between DNS & EJ LoadBalancers
        DNSLoadBalancer: spreading algorithm that publishes the llmap
        EJLoadBalancer: algorithm that publishes the ejmap
        MemoryEstimator: estimates memory requirements for webapps/appservers
        AppserverPlacer: decides ideal mapped ghosts for each appserver_type and min/max heapsizes
        WebappPlacer: decides ideal mapped ghosts for each webapp_type
        FlitDirector: decides weights for mapped ghosts for each webapp_type
        RateLimiter: decides actual mapped ghosts for each webapp/appserver_type
LoadBalancer:
Input: RegionMonitor interface (aggregate of ghostmon packets)
Output: llmap for each service & ejmap if service J is configured in the region.
Solution: The LoadBalancer will be dynamically configurable to switch between using EJLoadBalancer or not. If not using EJLoadBalancer, it will continue to produce the ejmap and llmap for J as it does currently (ejmap based on llmap). Otherwise, it first runs the EJLoadBalancer giving it all flit-capacities. Then, run the DNSLoadBalancer with the residual flit-capacities for all services except J. The llmap for service J may be based on the ejmap.
EJLoadBalancer:
    Input: RegionMonitor interface (aggregate of ghostmon packets)
Output: ejmap
Solution:
1. Initialize state: If the dnsp is a new leader, skip N iterations to allow some time for the previous leader's loads to complete.
Then, accept the set of loaded ghosts
for each webapp_type/appserver_type as the current state. If the dnsp was the leader before, use the previous mapped set of ghosts for each webapp_type/appserver_type as the current state except those that are "deferred unmapped". This allows the webapps/appservers in the process of loading to count towards memory usage, and also the webapps/appservers in the process of unloading to not count towards memory usage. Memory capacity for each ghost is further reduced by a buffer memory area whose space is configurable. This is used to allow slow unloads for session state and also to help correct bad memory estimates.
2. Run MemoryEstimator for fresh memory estimates.
3. Run AppServerPlacer to decide on the mapping of appserver_types and their min/max heapsizes.
4. Change the state as if the output of AppServerPlacer has already taken effect.
5. Run WebappPlacer to decide on the mapping of webapp_types.
6. Change the state deleting all webapps/appservers that are not yet loaded, setting their weights to 0.
7. Run FlitDirector to set the weights on the remaining webapps/appservers.
8. Run RateLimiter to control the rate of weights, mappings and unmappings.
AppserverPlacer
Inputs: set of appserver_types and for each:
    total flit-percent of each of its webapp_types
    memory estimate for itself+its webapp_types
    set of ghosts on which it is loaded and corresponding min/max heapsizes set of ghosts and for each:
        the memory capacity
        the flit-capacity
Outputs: set of appserver-ghost mappings with corresponding min/max heapsizes Solution:
1. Determine num. appservers to-be-mapped/unmapped for each appserver_type:
   For each appserver_type:
      If num. appservers<max (f/LTA, m, w/MXHP), the difference is to-be-mapped
      If num. appservers>f/UTA, the difference is to-be-unmapped
      (Refer requirements section above for explanation of terms).
2. Set the min/max heapsizes of the newly mapped appserver_types:
   Set the max heapsizes to MXHP (configurable).
   Set the min heapsize to MNHP (configurable)
3. Decide which appservers to unmap:
   Option 1: only memory:
      For each appserver_type, pick as many appservers as need to-be-unmapped, always picking from the ghost with the minimum memory.
   Option 2: memory and flits:
      For each appserver_type, pick as many appservers as need to-be-unmapped picking each one as follows:
      Assume average flits on each appserver of the appserver_type;
      Convert flits to memory units using FLIT_TO_MEMORY;
      Unmap the appserver on the ghost that has the:
         max across ghosts of
         max across resources (flit, memory) of
            percent increase in residual resource capacity of the ghost
4. Decide where to map the to-be-mapped appservers:
   Option 1: only memory:
      a. Order the appservers by decreasing memory
      b. For each appserver, map it to the ghost with the minimum residual memory capacity.
      c. If there is not enough residual memory capacity on any ghost, stop and report region suspended to the top-level.
   Option 2: memory and flits:
      a. Order the appservers by decreasing max(memory, flit * (FLIT_TO_MEMORY))
      b. For each appserver, map it to the ghost chosen as follows:
         Assume average flits on each appserver of the appserver_type;
         Convert flits to memory units using FLIT_TO_MEMORY;
         Map appserver to the ghost that has the:
            min across ghosts of
               max across resources (flit, memory) of
               percent decrease in residual resource capacity of the ghost
         (Note: if flit-disbalanced, use the max-flit ghost last).
      c. If there isn't enough residual capacity (on either resource) on any ghost, stop and report region suspended to the top-level.
WebappPlacer
Inputs: set of webapp_types and for each:
   total flit-percent
   memory estimate
   set of appservers and which ones have it loaded already
   set of ghosts and for each:
      the memory capacity
      the flit-capacity
Outputs: set of webapp-ghost mappings Solution:
1. Determine num. webapps to-be-mapped/unmapped for each webapp_type:
   For each webapp_type:
      If number of webapps<max (f/LTW, MW), the difference is to-be-mapped.
      If number of webapps>f/UTW, the difference is to-be-unmapped.
      (Refer requirements section above for explanation of terms).
2. If flit-disbalanced state persists for more than x iterations with the same ghost:
   order the webapp_types on the max-flit ghost in descending flit-order
   pick the first webapp_type that has any webapps to-be-unmapped.
   If found, unmap the webapp on the max-flit ghost and reduce the number to-be-unmapped.
   Otherwise, pick first webapp_type such that num. webapps>max (f/LTW, MW)
      if found, unmap the webapp on the max-flit ghost
      otherwise, pick the webapp_type with the max flit-to-memory and increase its number of webapps to-be-mapped by 1 (i.e. attempting a move);
      mark the webapp_type as flit-constrained, even if it isn't, so that only it is placed based on flits and not memory
3. Decide which webapps to unmap:
   (Exactly same as for appservers replacing appserver by webapp and ghost by appserver)
4. Decide where to map the to-be-mapped webapps:
   (Exactly same as for appservers replacing appserver by webapp and ghost by appserver)
FlitDirector
Inputs: set of webapp_types with corresponding flit-loads and loaded ghosts
   flit capacities of the ghosts
Outputs: weights for each webapp_type on each loaded ghost
   max flit-percent on a ghost
Solution: parametric flow algorithm
RateLimiter
Input: ideal mapped webapp-ghosts, appserver-ghosts and loaded webapp-ghosts, appserver-ghosts
Output: actual mapped webapp-ghosts, appserver-ghosts
Solution:
1. Mapping webapps/appservers: If there are more than MMW new webapp or MMA appserver mappings on the same ghost, then only actually map the one with the fewest instances
2. Unmapping webapps: mark the unmapped webapps as mapped with 0-weight and remember them as "deferred-unmapped". Unmap all previously deferred-unmapped webapps once flits drop to 0 or a timeout TW expires. In case a deferred-unmapped webapp becomes mapped, make it a regular mapped webapp. In case there is not enough (i.e. within some percent Y of) heap-memory to hold all the deferred unmapped webapps, start unmapping deferred-unmapped webapps in the order of decreasing number of instances.
3. Unmapping appservers: mark any unmapped appservers as "deferred-unmapped". Once all the webapps inside a deferred-unmapped appserver are unloaded or a timeout TA expires, mark the appserver as unmapped. In case there is not enough (i.e. within some percent X of) buffer-memory to hold all the deferred unmapped appservers, start unmapping deferred-unmapped appservers in the order of decreasing number of instances.

MemoryEstimator
Inputs: min_memory requirements for each webapp_type; actual memory for each appserver_type, relative-sizes for each webapp_type (dyn.config), scale-factor for each webapp_type (dyn.config), min/max heapsizes for each appserver_type (dyn.config)
Outputs: memory estimate for each webapp_type and appserver_type
Solution:
1. For each appserver_type, the memory estimate is the max of the default configured maxHeapSize and the max actual size of any appserver
2. For each webapp_type, the memory estimate is the max of the estimates arrived at by the following methods:
  a. take the min_webapp_size and multiply by the scale_factor
  b. for each appserver in which the webapp resides, take the fraction of the actual appserver memory (after subtracting the min appserver memory) based on the relative-sizes of webapps in the appserver, and take the max of this number across all instances of the webapp.

There is no requirement that application components be fully or partially J2EE-compliant, or even that the subject matter be implemented entirely in Java. Indeed, the present invention is also extensible beyond Java and J2EE. In particular, the inventive concepts may be practiced in any platform-independent application server programming environment (e.g., Microsoft .NET, Mod Perl executing in Apache, Zope, or the like) capable of being deployed in a distributed computing environment such as a content delivery network.

What is claimed is as follows:

1. Apparatus, comprising:
a processor,
computer memory holding computer program instructions executed by the processor to perform a load balancing method, the method comprising:
for each of a set of machines that is provisioned with a manager process and an application server on which one or more web applications are loaded and executed, identifying a resource usage value;
using the values to generate a weighted mapping of web applications to manager processes for the set of machines such that the resource usage value for each machine is not exceeded, and wherein the weighted mapping of web applications to manager processes balances a given resource value across the set of machines;
servicing requests at the machines in proportion to the weighted mapping; and
selectively re-generating the weighted mapping of web applications to manager processes for the set of machines if the resource usage values across the set of machines becomes unbalanced.

2. The apparatus as described in claim 1 wherein the resource usage value is an arbitrary unit of work representing resource usage on the machine.

3. The apparatus as described in claim 2 wherein the resource usage value is (i) a flit-capacity, and (ii) a memory capacity, where a flit is an arbitrary unit of work representing resource usage on the machine.

4. The apparatus as described in claim 1 wherein the weighted mapping of web applications to manager processes is also a function of application server memory capacity on each machine.

5. The apparatus as described in claim 1 wherein the resource usage value represents non-bandwidth resource usage at a machine.

6. The apparatus as described in claim 3 wherein the flit is CPU utilization.

7. The apparatus as described in claim 1 wherein the weighted mapping of web applications to manager processes requires a given web application to be loaded onto the machine.

8. The apparatus as described in claim 1 wherein the weighted mapping of web applications to manager processes requires a given web application to be unloaded from the machine.

9. The apparatus as described in claim 1 wherein the set of machines are co-located.

* * * * *